US012164711B2

(12) United States Patent
Perez et al.

(10) Patent No.: US 12,164,711 B2
(45) Date of Patent: Dec. 10, 2024

(54) DRIVER CIRCUIT AND METHOD FOR DRIVING A CAPACITIVE LOAD

(71) Applicant: Microsoft Technology Licensing, LLC, Redmond, WA (US)

(72) Inventors: Ahia Perez, Ramat Gan (IL); On Haran, Herzliya (IL); Evgeny Rogachov, Hod Hasharon (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/793,076

(22) PCT Filed: Jan. 14, 2021

(86) PCT No.: PCT/US2021/013503
§ 371 (c)(1),
(2) Date: Jul. 15, 2022

(87) PCT Pub. No.: WO2021/150427
PCT Pub. Date: Jul. 29, 2021

(65) Prior Publication Data
US 2023/0038681 A1 Feb. 9, 2023

(30) Foreign Application Priority Data

Jan. 24, 2020 (EP) .................................... 20153717

(51) Int. Cl.
*G06F 3/038* (2013.01)
*G06F 3/0354* (2013.01)
(Continued)

(52) U.S. Cl.
CPC ........ *G06F 3/0383* (2013.01); *G06F 3/03545* (2013.01); *G06F 3/0416* (2013.01); *G06F 3/0441* (2019.05); *G06F 3/0442* (2019.05)

(58) Field of Classification Search
CPC ........ G06F 3/038; G06F 3/0354; G06F 3/041; G06F 3/0383; G06F 3/03545; G06F 3/0416

See application file for complete search history.

(56) References Cited

U.S. PATENT DOCUMENTS 5,012,128 A    4/1991 Chan
6,057,631 A *  5/2000 Kouno .................... H02M 7/48
                                         310/316.01
(Continued)

FOREIGN PATENT DOCUMENTS

EP          1310936 A1    5/2003

OTHER PUBLICATIONS

"European Search Report Issued in European Patent Application No. 20153717.2", Mailed Date: Jun. 29, 2020, 9 Pages.
(Continued)

*Primary Examiner* — Olga V Merkoulova
(74) *Attorney, Agent, or Firm* — Barta Jones, PLLC

(57) ABSTRACT

An apparatus and method for a voltage driver circuit where a path between a ground node and an output node includes an inductor and/or another storage element and an energy transfer circuit composed of at least two switching elements (e.g., transistors) and at least two valve elements (e.g. diodes). The energy transfer circuit operates to discharge a capacitive load (e.g. output capacitor) into the storage element and facilitate transition from low to high voltage while increasing efficiency. An additional path to ground may be included via another switching element to prevent crosstalk and hold the output at ground potential.

20 Claims, 8 Drawing Sheets

(51) Int. Cl.
*G06F 3/041* (2006.01)
*G06F 3/044* (2006.01)

(56) References Cited

U.S. PATENT DOCUMENTS

| | | | |
|---|---|---|---|
| 6,573,752 B1 | 6/2003 | Killat | |
| 9,740,311 B1* | 8/2017 | Omelchuk | G06F 3/0338 |
| 9,874,966 B2 | 1/2018 | Ribeiro | |
| 9,891,724 B2 | 2/2018 | Kao et al. | |
| 10,095,329 B1* | 10/2018 | Laslo | H03F 3/217 |
| 10,514,785 B1* | 12/2019 | Hara | G06F 3/04162 |
| 10,521,041 B2* | 12/2019 | Ivanov | G06F 3/04166 |
| 10,788,903 B2* | 9/2020 | Yuan | G06F 3/044 |
| 2002/0041275 A1* | 4/2002 | Mccormack | G09G 3/2965 345/204 |
| 2006/0221000 A1* | 10/2006 | Moon | G09G 3/2965 345/68 |
| 2013/0076697 A1 | 3/2013 | Goertz et al. | |
| 2014/0085242 A1 | 3/2014 | Sawada et al. | |
| 2014/0176495 A1* | 6/2014 | Vlasov | G06F 3/0441 345/174 |
| 2016/0048260 A1* | 2/2016 | Ivanov | G06F 3/04166 345/174 |
| 2017/0060278 A1* | 3/2017 | Jung | G06F 3/03545 |
| 2018/0046272 A1* | 2/2018 | Hara | G06F 3/044 |
| 2019/0179435 A1* | 6/2019 | Yuan | H02M 7/537 |

OTHER PUBLICATIONS

"International Search Report and Written Opinion Issued in PCT Application No. PCT/US21/013503", Mailed Date: May 3, 2021, 13 Pages.
Office Action Received for Indian Application No. 202247038426, mailed on May 2, 2024, 7 pages.
Communication pursuant to Article 94(3) Received for European Application No. 21702831.5, mailed on Mar. 20, 2024, 6 pages.

* cited by examiner

DRIVER CIRCUIT AND METHOD FOR DRIVING A CAPACITIVE LOAD

BACKGROUND

Electronic devices, especially tablets or smart phones, may accept input via handheld peripheral devices, such as a pen or stylus, and may then act as host devices to the peripheral devices. The stylus may be held manually by a user in relation to a display screen (e.g. touch screen) of a digitizer to provide input to the electronic device. Positions of the stylus over the display screen are correlated with virtual information portrayed on the display screen. Position detection and data transfer (i.e. communication) is achieved via capacitive coupling between the stylus and the display screen of the digitizer (and vice versa). More specifically, a driver circuit is configured to generate binary information (bits) by applying a voltage on a tip electrode of the stylus to generate a current through the capacitance between the tip electrode and the display screen of the digitizer. This current can be sensed by the digitizer. Similarly, such a driver circuit may as well be provided at the digitizer to transfer data via the tip electrode to the stylus.

SUMMARY

This Summary is provided to introduce a selection of concepts in simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

The disclosure in some embodiments relates to a driver circuit for supplying a drive signal via an output terminal to a capacitive load, wherein the driver circuit comprises:

an energy storage element; and an energy transfer circuit configured to transfer electric charge from the capacitive load to the energy storage element at a first edge of the drive signal and to transfer electric charge from the energy storage element to the capacitive load fat a second edge of the drive signal.

According to an aspect of some embodiments, a stylus comprises the driver circuit, wherein the driver circuit is configured to supply the drive signal to a tip electrode of the stylus.

According to another aspect, a host device comprises the above driver circuit, wherein the driver circuit is configured to supply the drive signal to a sensor array of a touch-sensitive display.

According to a further aspect, a method of supplying a drive signal via an output terminal to a capacitive load comprises controlling an energy transfer circuit to transfer electric charge from the capacitive load to an energy storage element at a first edge of the drive signal and to transfer electric charge from the energy storage element to the capacitive load at a second edge of the drive signal.

The enhanced driver circuit and drive control method provide high efficiency for high voltage drivers with high capacitive loads to reduce power consumption substantially.

Unless otherwise defined, all technical and/or scientific terms used herein have the same meaning as commonly understood by one of ordinary skill in the art. Although methods and materials similar or equivalent to those described herein can be used in practice or testing of embodiments of the disclosure, example methods and/or materials are described below. In addition, the materials, methods, and examples are illustrative only and are not intended to be necessarily limiting.

BRIEF DESCRIPTION OF THE DRAWINGS

To assist understanding of the present disclosure and to show how embodiments of such may be put into effect, reference is made, by way of example only, to the accompanying drawings in which.

DETAILED DESCRIPTION

The present disclosure is directed to a driver circuit for driving a capacitive load, which may be provided in a stylus and/or a touch screen controller of a digitizer or any other electronic device which is configured to supply an output signal to a capacitive load.

A hand-held stylus peripheral ("stylus") for use with electronic devices, including smart phones, tablets, watches, desktop computers, gaming devices, wearable device, televisions, video conferencing systems, etc. may be used to communicate user input to an electronic device ("host device"). Some host devices include a display with a built-in digitizer to sense signals transmitted from the stylus (e.g., an "active stylus"). In these electronic devices, a user interacts with the digitizer system by positioning and moving the stylus over a sensing surface of the system, e.g., a tablet and/or a touch screen. The position of the stylus with respect to the sensing surface is tracked by the digitizer system and interpreted as a user command. In some technologies, the position of the stylus can be determined based on detection of capacitive coupling between an electrode of the stylus and one or more electrodes of the digitizer. For example, the device display may include a digitizer with a plurality of X and Y oriented conductors or a resistive film to receive signals transmitted from the electrode of the active pen. To accurately identify tip position, the transmitting electrode is, in some technologies, physically positioned within a writing tip of the stylus.

A stylus can be classified as a passive stylus or an active stylus. The passive stylus utilizes sensing methods based on changes in the capacitive coupling between sensor electrodes deposited on a touch-screen sensor and an input object, such as a rubber-tipped stylus or figure. In contrast, the active stylus drives unique modulated signals between the tip electrode (antenna) of the stylus and a grid or matrix of electrodes of the touch-screen sensor (e.g., a digitizer system) and utilizes sensing methods based on changes in the capacitive coupling between sensor electrodes. The digitizer system detects at least one position of the stylus based on the signal emitted and the detected position provides input to the electronic device (e.g. a computing device) associated with the digitizer system. The detected position may then be interpreted as user commands. Often, the digitizer system is integrated with a display screen, e.g., to form a touch-sensitive display device.

An active stylus may generate a modulated signal that may be detectable by the digitizer. The signal may be encoded with information such as the device identification, operational mode (e.g., writing, erasing), pressure/force information, tilt information, and other information. The information may be allocated to various portions of the signal.

Figure 1:
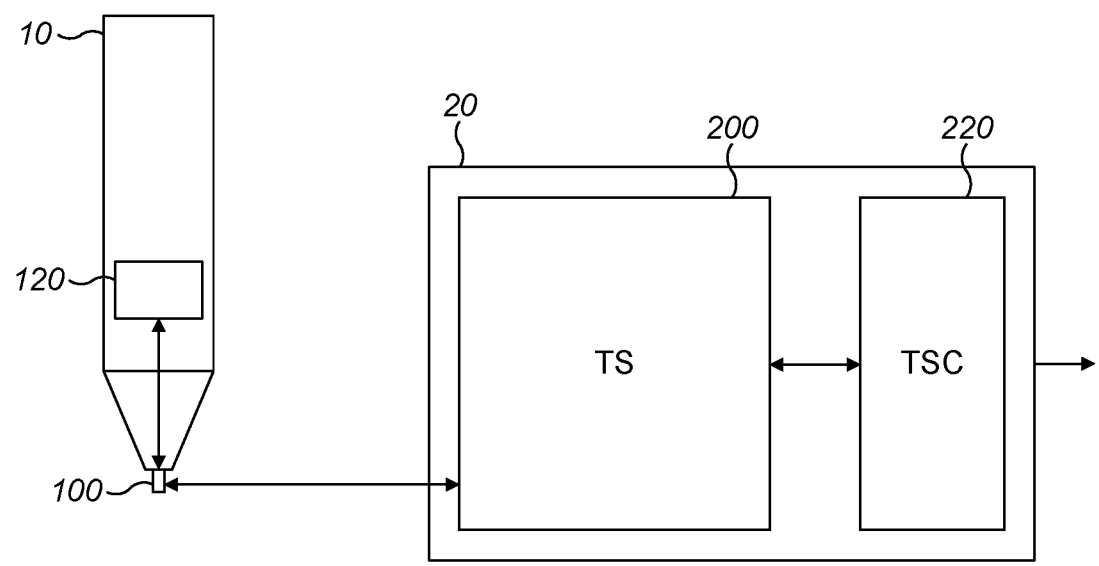
FIG. 1 is a schematic block diagram of an example system comprising a stylus and a host device.

FIG. 1 is a schematic illustration of an example system comprising a host device (e.g. touch-sensitive display device) 20 and a stylus 10 with a driver circuit 120 for applying an output signal to a tip electrode 100 (output electrode) of the stylus 10 and for receiving an input signal from the host device via a capacitive coupling between the tip electrode 100 and a touch screen (TS) 200 or other type of touch-sensitive display of the host device 20. The touch screen 200 is controlled by a touch screen controller (TSC) 220 which provides an interface between a capacitive touch screen sensor array (e.g. a grid or matrix of electrodes) of the touch screen 200 and the controlled host device 20. The touch screen controller 220 may be connected to the touch screen sensor array of the touch screen 200 and to the host device 20 via a serial connection such as RS232 or universal serial bus (USB). The capacitive touch screen sensor array may be placed on a special panel coated with e.g. indium tin oxide and configured to conduct a continuous electrical current across the sensor array in order to detect changes in capacitance.

The touch screen controller 220 may be configured to apply a voltage across a row and column arrangement of the touch sensor array that makes up the touchscreen. The touch sensor array may be scanned by testing rows and columns while they are being stimulated. Testing may involve detecting the impedance of the circuit by the amplitude of the voltage across the touch sensor array at each coordinate. This may be achieved by a differential amplifier and an analog-to-digital converter (usually of the successive approximation type). This information is passed to the host device 20 for analysis.

It is noted that, for reasons of brevity, only those system components are shown in FIG. 1 and the following FIGS. 2, 4, 6 and 10, that are useful for explaining specific example operations of example embodiments. Moreover, unless indicated otherwise, components or signals with identical reference signs have same or similar functionalities and/or structures which may be described only once in the present disclosure.

Figure 2:
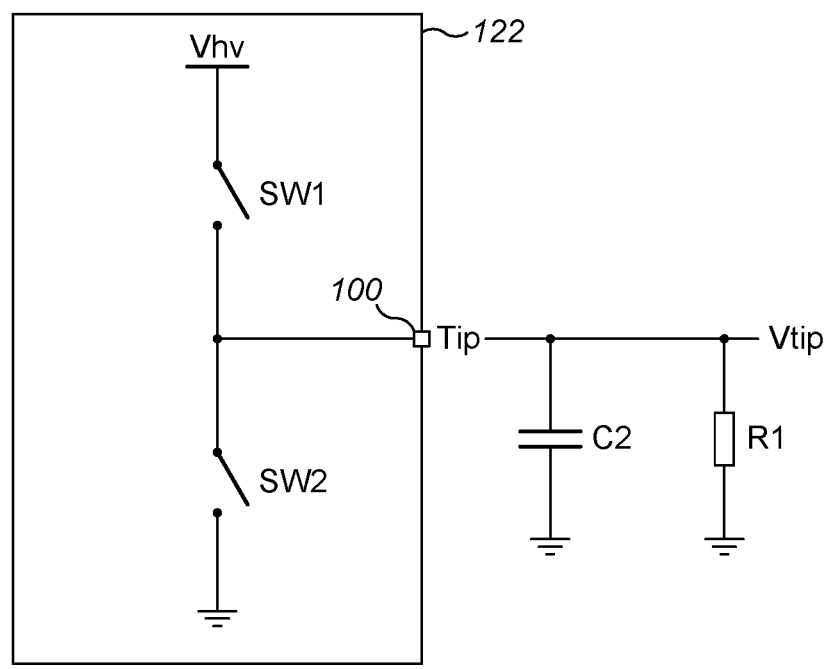
FIG. 2 is a schematic circuit diagram of an example driver circuit with a push-pull circuit for applying a tip voltage of a stylus.

FIG. 2 is a schematic circuit diagram of an example driver circuit with a push-pull circuit 122 for applying a dynamically changing voltage Vtip (e.g. a rectangular binary signal) to the tip electrode 100 of the stylus 10 of FIG. 1.

As an alternative, the driver circuit may as well be provided at one or more output terminal(s) of the touch screen controller 220 for applying a voltage to the touch screen sensor array.

The input impedance of the touch screen 200 is represented by a capacitive load C2 and a resistive load R1. The capacitive load C2 represents a first capacitance (e.g. about 30 picofarads (pF)) between the tip electrode 100 and ground (reference potential) and a second capacitance (e.g. about 30 femtofarads (fF)) between the tip electrode and the touch sensor array of the touch screen 200. In view of its small value, the second capacitance can be neglected when the capacitive load C2 is determined. Furthermore, the parallel resistive load R1 is very high and its influence on the dynamic behavior of the impedance in the considered frequency range (in the kilohertz (kHz) range up to about 1 megahertz (MHz)) of the drive signal (e.g., the tip voltage Vtip) supplied via the tip electrode 100 can therefore be neglected as well.

The push-pull circuit 122 of FIG. 2 consists of two controllable switching elements SW1, SW2 which are connected between a supply terminal of a high voltage Vhv and a reference potential (e.g. ground) and which may be implemented as semiconductor switches (e.g. transistors) controlled by a drive control circuit (not shown in FIG. 2).

Figure 3:
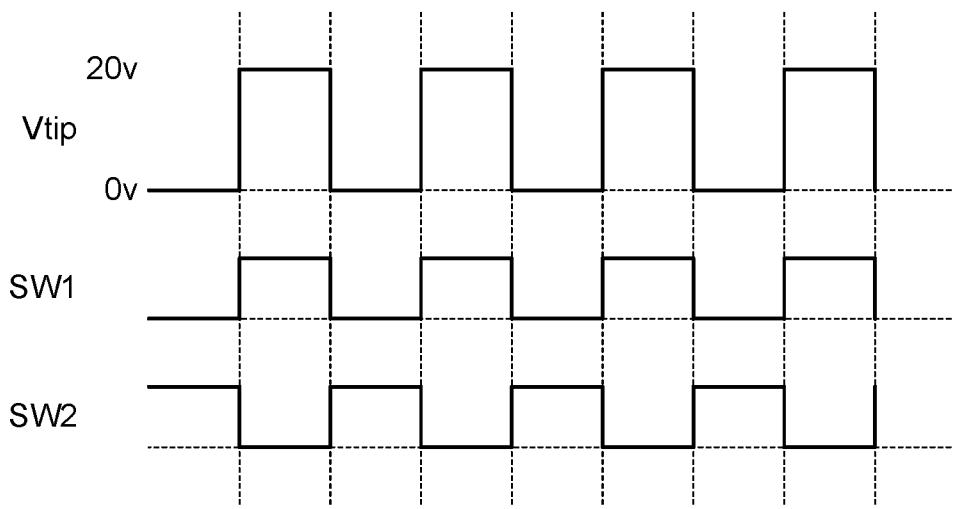
FIG. 3 is a schematic waveform diagram with example signals for the driver circuit.

FIG. 3 is a schematic waveform diagram with example signals of the driver circuit of FIG. 2. More specifically, the upper waveform in FIG. 3 represents the tip voltage Vtip, the middle waveform represents a control signal of the first switching element SW1, and the lower waveform represents a control signal of the second switching element SW2. The control of the first and second switching elements SW1, SW2 is configured so that a high control signal closes the corresponding switching element while a low control signal opens the corresponding switching element.

As shown in FIG. 3, the first switching element SW1 is closed and the second switching element SW2 is opened during a positive halfwave or pulse of the rectangular tip voltage Vtip, while the first switching element SW1 is opened and the second switching element SW2 is closed during a negative halfwave or pause of the rectangular tip voltage Vtip. Thereby, the capacitive load C2 is charged via the first switching element SW1 at the rising edge of the tip voltage Vtip and discharged to ground via the second switching element SW2 at the falling edge of the tip voltage Vtip.

Thus, the push-pull circuit 122 is used to generate the tip voltage Vtip with binary information (e.g. data bits) and a high voltage value (e.g. 20 volts (V)) at the tip electrode 100 of the stylus. The tip voltage Vtip generates a current through the capacitance between the tip electrode 100 and the touch screen of the digitizer of the host device. This current can be sensed by the digitizer to determine the location of the stylus and/or additional information communicated by the tip voltage Vtip.

A high tip voltage Vtip is desirable to increase signal power and efficiency of the driver circuit, because the current through the capacitance between the tip electrode 100 and the touch screen of the digitizer of the host device is very low. However, the capacitive load C2 at the tip electrode 100 causes considerable energy loss through the discharging of energy stored in the capacitive load C2 to ground at every falling edge of the tip voltage Vtip, generally at a frequency in the kHz range. These energy losses depend on the tip voltage Vtip, the value of the capacitance and the frequency and can for example amount to about 30% of total power consumption of the driver circuit.

Figure 4:
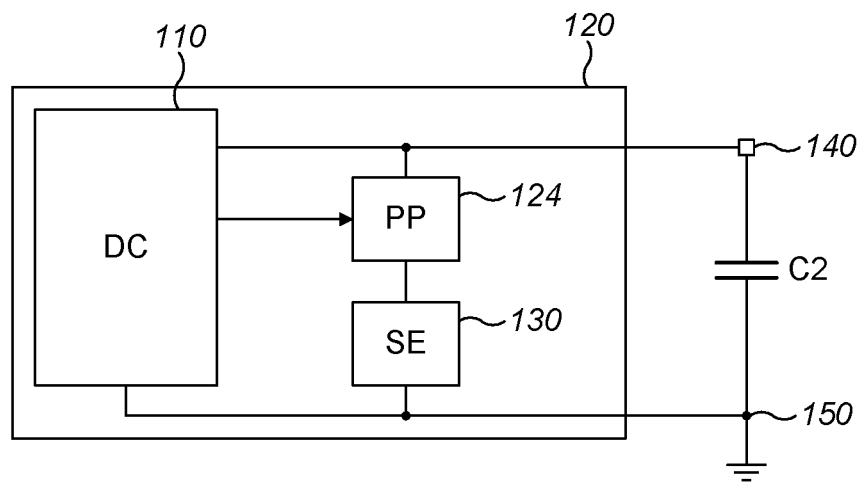
FIG. 4 is a schematic block diagram of an example driver circuit with an energy transfer circuit for improved efficiency.

FIG. 4 is a schematic block diagram of an example driver circuit 120 with an energy transfer circuit (PP) 124 for improved power efficiency. The energy transfer circuit 124 is arranged in a path between a reference terminal at a reference potential 150 (e.g. ground potential) and an output terminal 140 (e.g. the tip electrode 100 of the stylus 10 or an output electrode of the touch screen controller 220 of FIG. 1). The driver circuit 120 includes a storage element (SE) 130 (e.g. at least one inductive element such as an inductor or coil or the like) or a combination of at least one inductive element and at least one capacitive element (e.g. a capacitor or MOS transistor or varactor or the like) for temporarily storing charging energy of the capacitive load C2. The energy transfer circuit (PP) 124 may be composed of an arrangement of at least two switching elements (e.g. semiconductor switching elements such as transistors, thyristors etc.) and at least two valve elements (e.g. diodes, transistors etc.) and which may be integrated on a semiconductor chip.

Furthermore, the energy transfer circuit 124 is controlled by control signals generated by a driver control circuit (DC) 110 to direct energy discharged from the capacitive load C2 into the storage element 130 and to recharge the capacitive load C2 before the next discharging cycle. The driver control circuit 110 may be implemented by an integrated or discrete hardware circuit (e.g. a digital logic circuit, an analog circuit, an application specific integrated circuit (ASIC) or digital signal processor (DSP)) or a software-controlled microcontroller (e.g. central processing unit (CPU)) integrated on the same chip or the same circuit board as the driver circuit 120 and/or the energy transfer circuit 124.

Thus, the energy transfer circuit 124 is controlled by the driver control circuit 110 to discharge and recharge the capacitive load C2 (e.g., an output capacitor) and facilitate the transition from low to high value of the voltage at the output terminal 100 to thereby reduce energy loss and increase efficiency of the driver circuit 120.

Figure 5:
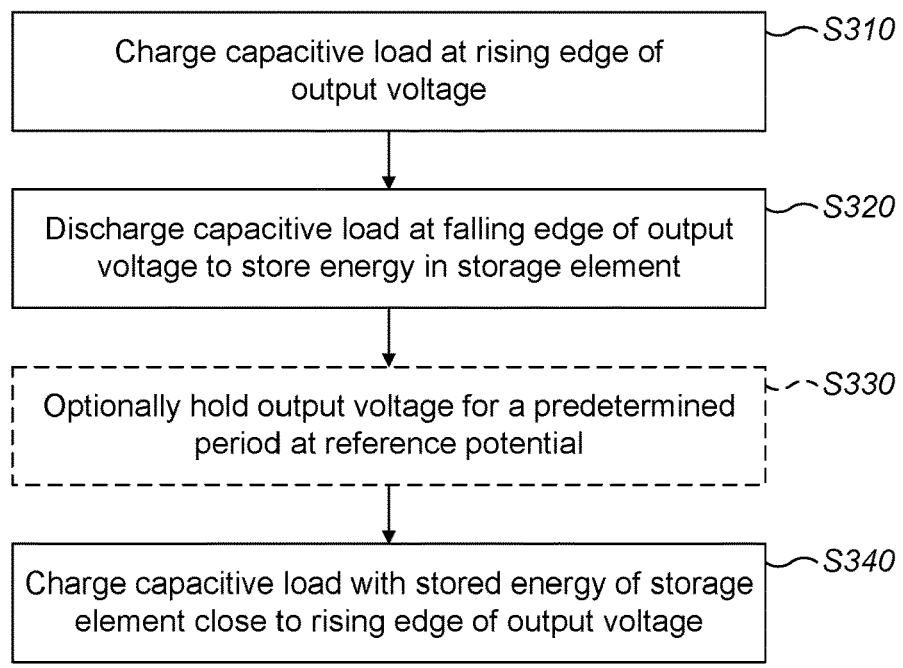
FIG. 5 is a schematic flow diagram of an example driver procedure for controlling the energy transfer circuit.

FIG. 5 is a schematic flow diagram of an example driver control procedure for controlling an energy transfer circuit with a switched energy storage element (e.g. the energy storage element 130 of FIG. 4).

The driver control procedure may be implemented by a software routine stored in a memory and used to control a processor or controller in a driver control circuit (e.g. the driver control circuit 110 of FIG. 4) to apply control signals to control the energy transfer circuit (e.g. the energy transfer circuit 124 of FIG. 4).

At S310 the procedure controls the energy transfer circuit to charge the capacitive load C2 at a rising edge of the output voltage at an output terminal of the driver circuit, e.g., the output terminal (tip electrode) 100 of the driver circuit 120 of the stylus 10 and/or an output terminal of a driver circuit of the touch screen controller 220 of FIG. 1. Then, at S320, the energy transfer circuit is controlled to discharge the capacitive load C2 into the storage element of the driver circuit at a falling edge of the output voltage to temporarily store energy in the storage element.

At S330, the energy transfer circuit may optionally be controlled to intermittently connect (pull down) the output terminal to a reference potential (e.g. ground potential) of the output voltage for a predetermined time period (e.g. between the falling edge and the next rising edge of the output voltage) in order to reduce crosstalk and/or other noise.

At S340, the energy transfer circuit is controlled to recharge the capacitive load C2 with the energy stored in the storage element prior to the next rising edge of the output voltage used for further charging of the capacitive load to a maximum value of the output voltage.

With the above driver control procedure, the charge stored in the capacitive load is temporarily stored in the storage element and retransferred to the capacitive load C2 to thereby enhance efficiency and reduce power loss of the driver circuit.

Non-limiting examples of possible arrangements of switching elements (e.g., SW1 to SW4) and valve elements (e.g. diodes D1 and D2) in an energy transfer circuit of a driver circuit of a stylus (e.g. the driver circuit 120 of the stylus 10 of FIG. 1) are described in more detail with reference to FIGS. 6 to 14. The switching elements shown in FIGS. 6 and 10 are optionally implemented as controllable semiconductor switches (e.g. PMOS, NMOS, or CMOS transistors).

Figure 6:
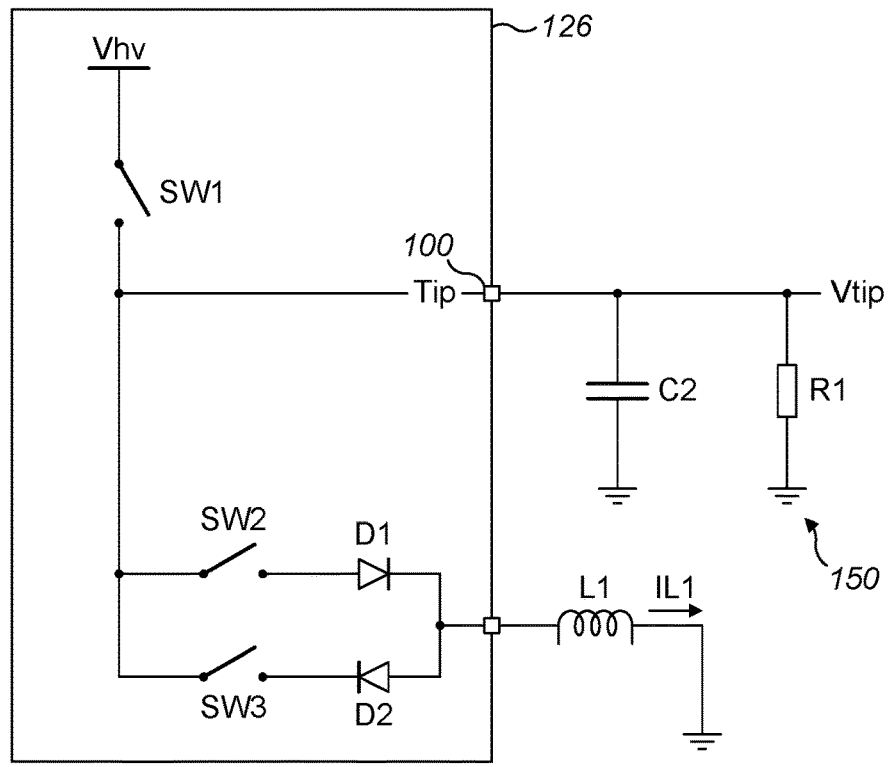
FIG. 6 is a schematic circuit diagram of a driver circuit with a first example of an enhanced push-pull circuit for improved efficiency.

FIG. 6 is a schematic circuit diagram of a driver circuit with a first more detailed example of an energy transfer circuit configured as an enhanced push-pull circuit 126 for improved efficiency in case of an output voltage with a voltage swing around zero (e.g. −9V to +11V or −18V to +20V), e.g., positive and negative halfwaves of the rectangular output voltage of the driver circuit.

In the example of FIG. 6, a parallel connection of second and third switching elements SW2, SW3 with respective serially connected antiparallel diodes D1, D2 is serially connected between a first switching element SW1 and an inductor L1 in a circuit path between a terminal of a supply voltage Vhv and a reference potential 150 (e.g. ground potential) of the tip voltage Vtip at the tip electrode 100 of the stylus. The tip electrode 100 is connected between the first switching element SW1 and the parallel connection with the second and third switching elements SW2, SW3 and the first and second diodes D1, D2.

It is noted that the switching state of the first to third switching elements SW1 to SW3 is controllable via respective control signals applied by a driver control circuit (e.g. DC 110, FIG. 4) not shown in FIG. 6.

Furthermore, the inductor L1 may be provided as an external circuit element while the first to third switching elements SW1 to SW3 and the first and second diodes D1, D2 may be integrated on a chip, or on one or more chip modules, of the enhanced push-pull circuit 126 or the whole driver circuit.

Moreover, it is noted that with the driver circuit of FIG. 6 a voltage around e.g. 10V could for example be generated if the inductor L1 was connected to a reference potential 150 of e.g. 10V instead of ground potential. Of course, other values of the reference potential 150 could be applied as well.

Figure 7:
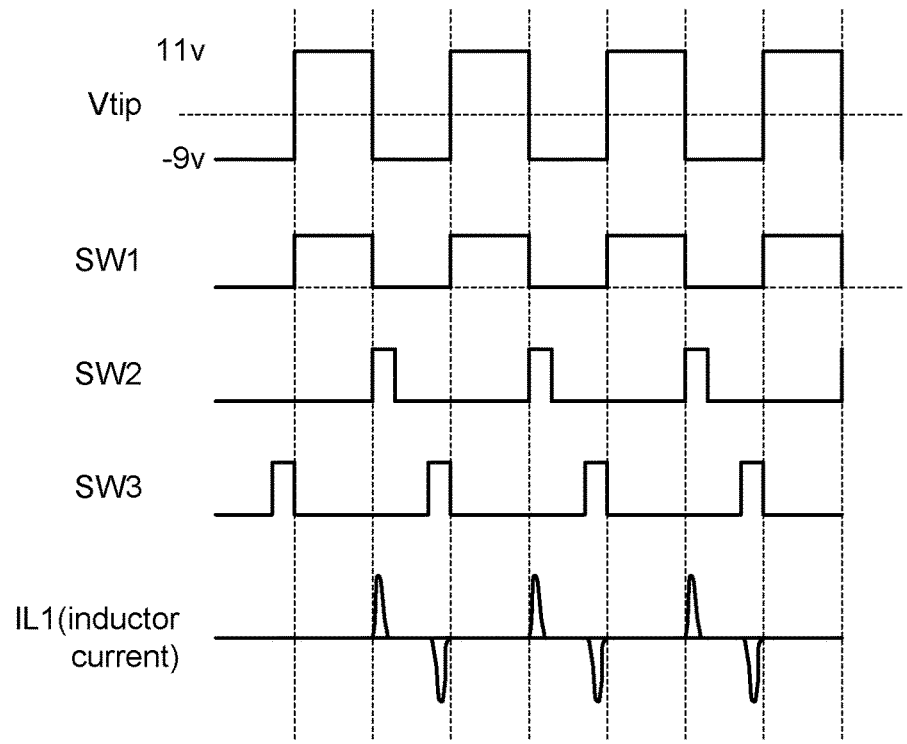
FIG. 7 is a schematic waveform diagram with example signals for the first example of the enhanced push-pull circuit.

FIG. 7 is a schematic waveform diagram which shows from top to bottom the waveforms of the tip voltage Vtip, a control signal of the first switching element SW1, a control signal of the second switching element SW2, a control signal of the third switching element SW3 and the inductor current IL1 of the first example of the enhanced push-pull circuit of FIG. 6. The value and sign of the control signals is selected based on the respective types of the first to third switching elements SW1 to SW3.

At a falling edge, e.g., a transition of the rectangular tip voltage Vtip from high to low voltage, the second switching element SW2 is controlled to be closed (and the current path is opened) for a predetermined time period (positive pulse of the respective control signal) until the tip voltage Vtip changes to the low voltage to discharge the capacitive load C2 via the first diode D1 (valve element) into the inductor L1. This is indicated by a positive pulse in the waveform of the inductor current IL1. Due to the generated magnetic field (stored magnetic energy) of the inductor L1, the current IL1 through the inductor L1 continues to flow after complete discharge of the capacitive load so as to pull the potential at the tip electrode 100 to a negative value. The valve effect of the first diode D1 in the current path prevents a change of the flow direction of the current IL1 to thereby suppress an oscillation between the inductor L1 and the capacitive load C2.

Shortly before the subsequent rising edge, e.g., a transition of the tip voltage Vtip from low to high voltage, the capacitive load C2 is charged with a negative voltage during the discharging phase via the second switching element SW2 and a closing (e.g. positive pulse of the respective control signal) of the third switching element SW3 causes the capacitive load C2 to discharge into the inductor L1 which pulls the tip voltage Vtip to a positive value. This is indicated by a negative pulse in the waveform of the inductor current IL1. The timing of the switching of the third switching element SW3 is selected according to the desired waveform of the tip voltage. After that, the first switching element SW1 is closed at the rising edge of the tip voltage Vtip so that the capacitive load C2 is charged via the first switching element SW1 to the value of the supply voltage Vhv, while the second and third switching elements SW2 and SW3 are open. As an example, the second switching element SW2 can be open (non-conductive) for the whole rising edge of the tip voltage Vtip. During the rising edge, the third switching element SW3 can be closed (conductive). The first switching element SW1 can be closed (conductive) after the inductor L1 has charged the capacitive load C2. The second diode D2 allows that the first switching element SW1 can be closed while the third switching element SW3 is closed, but this is an optional feature.

Figure 8:
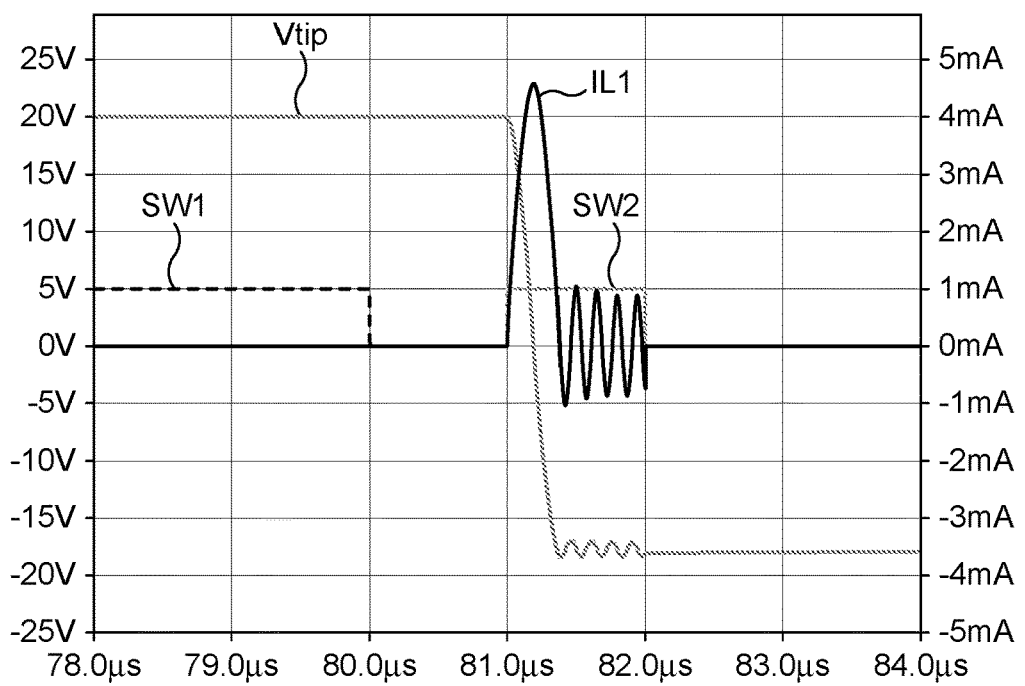
FIG. 8 is a waveform diagram with example measured signals of the first example of the enhanced push-pull circuit at a falling edge of a tip voltage of a stylus.

FIG. 8 is a waveform diagram with different measured waveforms of the tip voltage Vtip, control signals of the switching elements SW1 and SW2 and the inductor current IL1 through the inductor L1 obtained as a result of a simulation of the first example of the enhanced push-pull circuit (FIG. 6) at a falling edge of the tip voltage Vtip of the stylus. In this example, the tip voltage Vtip changes in a substantially rectangular manner between about +20V and about −17V.

As shown in FIG. 8, the inductor current IL1 is generated as a positive pulse at the falling edge of the tip voltage Vtip and includes some small parasitic oscillations until the second switching element SW2 is subsequently opened. These small parasitic oscillations are also reflected at the beginning of the negative halfwave of the tip voltage Vtip while the second switching element SW2 is closed and coupling the inductor L1 with the tip electrode 100. The small parasitic oscillations are caused by a non-ideal behaviour of the diode D1 and therefore depend on the circuit design. The first and second diodes D1, D2 may be replaced by respective control loops that close the corresponding switching element when the current has reached zero.

Figure 9:
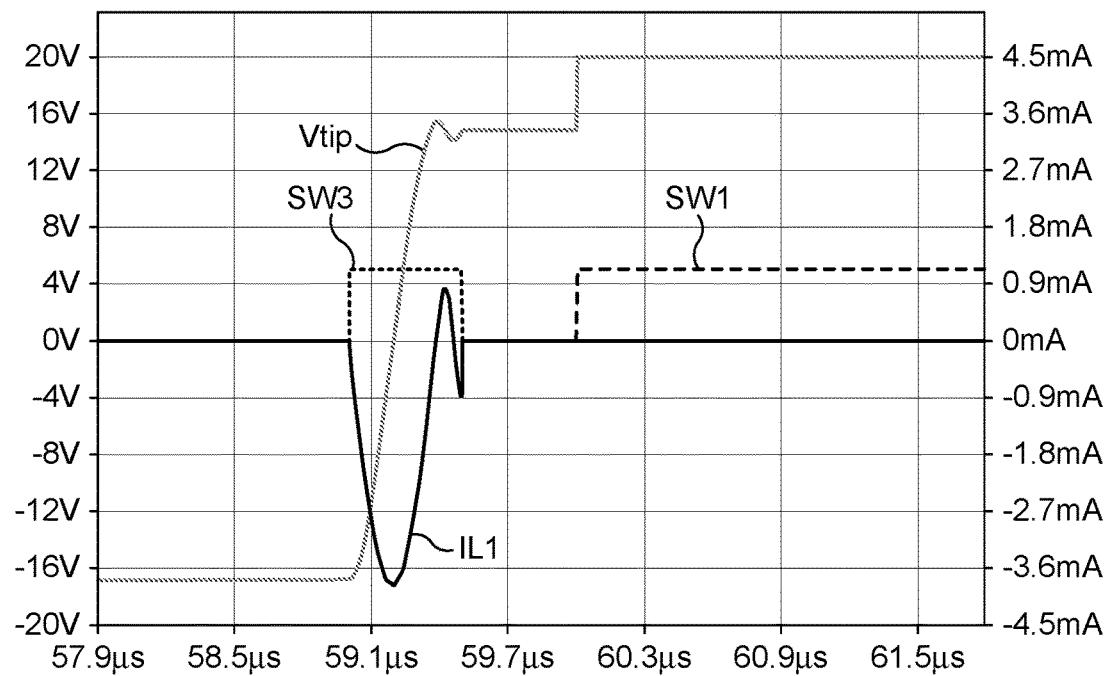
FIG. 9 is a waveform diagram with example measured signals of the first example of the enhanced push-pull circuit at a rising edge of the tip voltage of the stylus.
Figure 10:
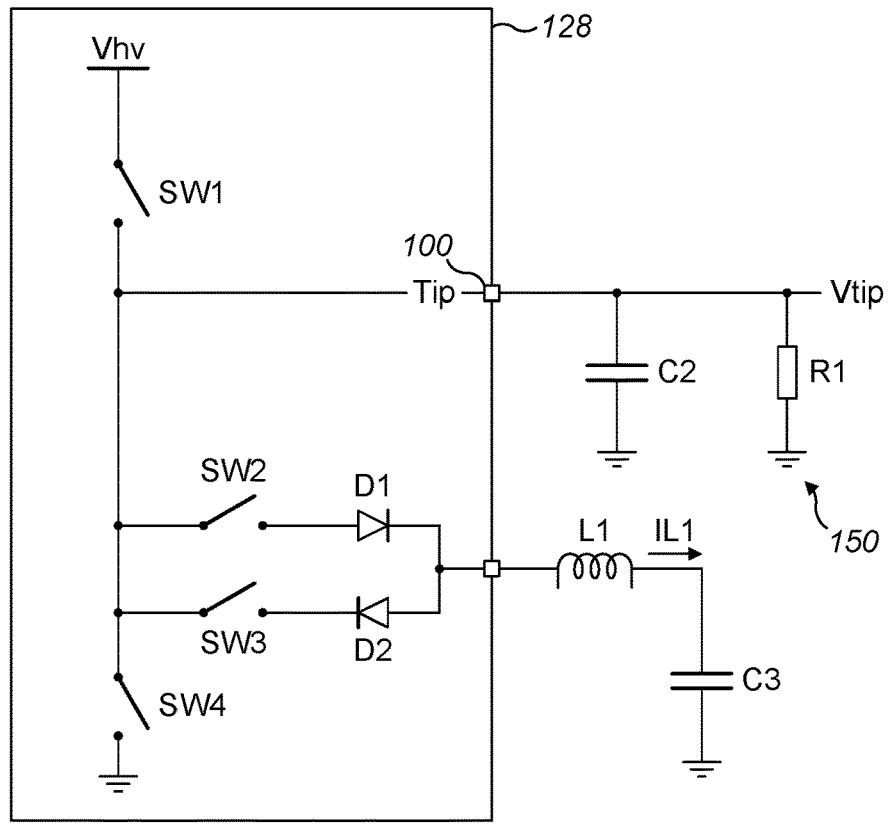
FIG. 10 is a schematic circuit diagram of a driver circuit with a second example of the enhanced push-pull circuit for improved efficiency and reduced crosstalk.

FIG. 9 is a waveform diagram with the different measured waveforms of the tip voltage Vtip, control signals of the switching elements SW1 and SW3 and the inductor current IL1 through the inductor L1 of the simulation of the first example of the enhanced push-pull circuit at a rising edge of the tip voltage Vtip of the stylus.

As shown in FIG. 9, the inductor current IL1 is generated as a negative pulse at the rising edge of the tip voltage Vtip and includes some small parasitic oscillations (due to non-perfect diode behavior) until the third switching element SW3 is subsequently opened. These small parasitic oscillations are also reflected at the beginning of the positive halfwave of the tip voltage Vtip while the third switching element SW3 is closed and coupling the inductor L1 with the tip electrode 100. However, in this example, the re-charging of the capacitive load C2 with the stored charge of the inductor L1 by the inductor current IL1 during the closed state of the third switching element SW3 is not sufficient to reach the maximum value (+20V) of the tip voltage Vtip again, due to remaining energy losses during the charging and re-charging process via the inductor L1. As can be gathered from the waveform diagram, the capacitive load C2 is first re-charged to an intermediate maximum value of about +15V. Thereafter, the original maximum value (+20V) of the tip voltage Vtip is reached when the first switching element SW1 is subsequently closed and the capacitive load C2 is charged to the full value of the supply voltage Vhv. In this way, the supply voltage Vhv is used to charge the capacitive load C2 from +15V to +20V, rather than from 0V to +20V as may be the case with a conventional push-pull circuit. Thus, for the same peak-to-peak value of the tip voltage Vtip, the conventional push-pull circuit of FIG. 2 would require about four times more power than the exemplary driver circuit of FIG. 10. From a design perspective, the driver circuit and its supply voltage Vhv can thus be designed to meet the requirements for the peak-to-peak value of the tip voltage Vtip at muss less power loss.

FIG. 10 is a schematic example circuit diagram of a driver circuit with a more detailed second example of an energy transfer circuit implemented as an enhanced push-pull circuit 128 for improved efficiency in case of an output voltage that stays in a positive voltage range (e.g. 0V to +20V) above ground potential with a resulting steady state. Furthermore, the fact that the tip voltage Vtip and other circuit voltages are positive voltages above ground potential is advantageous for the chip design. Such a positive voltage range reduces complexity of input/output (I/O) circuit measures required for protection against electrostatic discharge (ESD).

Moreover, a reduced crosstalk can be achieved by providing an additional path to the reference potential 150 (e.g. ground potential) via an additional fourth switching element SW4 which may also be controlled by a driver control circuit (not shown in FIG. 10) to couple the tip electrode 100 for a temporary period to the reference potential 150.

In this example, similar to FIG. 6, the parallel connection of the second and third switching elements SW2, SW3 with respective serially connected diodes D1, D2 is serially connected between the first switching element SW1 and the inductor L1 in the circuit path between the terminal of a supply voltage Vhv and the reference potential (e.g. ground potential) of the tip voltage Vtip at the tip electrode 100 of the stylus. Furthermore, the tip electrode 100 is again connected between the first switching element SW1 and the parallel connection with the second and third switching elements SW2, SW3 and the first and second diodes D1, D2.

However, unlike in the first example of FIG. 6, the fourth switching element SW4 is connected between the tip electrode 100 and the reference potential 150. Furthermore, an additional storage capacitor C3 is connected in series between the inductor L1 and the reference potential 150 to store a steady-state DC component of the rectangular tip voltage Vtip. The additional storage capacitor C3 provides an advantage in that an additional voltage supply structure (e.g. rail) and related costs can be prevented. In the example of FIG. 10, the additional storage capacitor C3 is charged to one half of the supply voltage Vhv in the steady state.

It is noted that the switching state of the first to fourth switching elements SW1 to SW4 is again controllable via respective control signals applied by a driver control circuit (e.g. DC 110 of FIG. 4) not shown in FIG. 10. These control signals are again adapted to the respective types of the switching elements SW1 to SW4.

Furthermore, the inductor L1 and/or the storage capacitor C3 may be provided as an external circuit element while the first to third switching elements SW1 to SW4 and the first and second diodes D1, D2 may be integrated on a chip, or on one or more chip modules, of the enhanced push-pull circuit 128 or the whole driver circuit.

Figure 11:
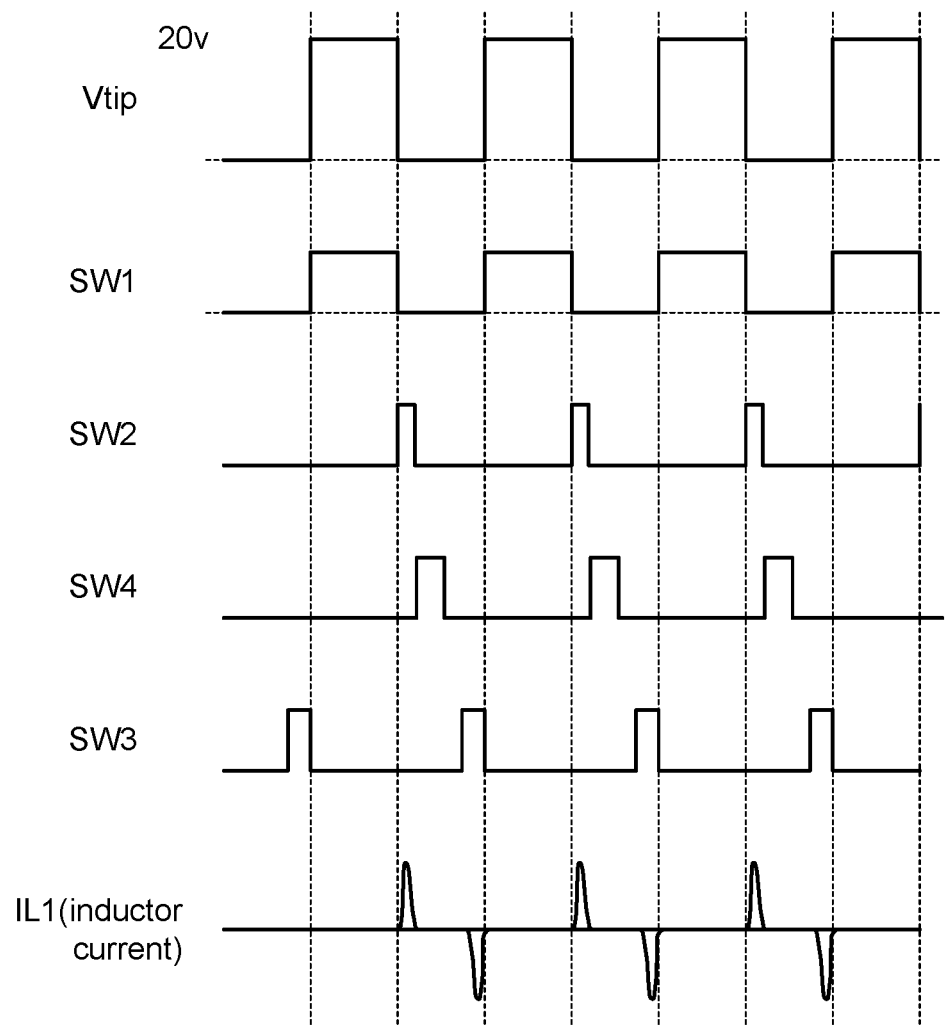
FIG. 11 is a schematic waveform diagram with example signals of the second example of the enhanced push-pull circuit.

FIG. 11 is a schematic waveform diagram which shows from top to bottom the waveforms of the tip voltage Vtip, a control signal of the first switching element SW1, a control signal of the second switching element SW2, a control signal of the fourth switching element SW4, a control signal of the third switching element SW3 and the inductor current IL1 of the second example of the enhanced push-pull circuit of FIG. 10.

At a falling edge, e.g., the transition of the rectangular tip voltage Vtip from high to low voltage, the second switching element SW2 is controlled to be closed (and the current path is opened) for a predetermined time period (positive pulse of the respective control signal) less than half of the period of the tip voltage Vtip to discharge the capacitive load C2 via the first diode D1 (an example valve element) through the inductor L1 into the storage capacitor C3. This is indicated by a positive pulse in the waveform of the inductor current IL'. Due to the use of the inductor L1, there is only a little remaining energy loss caused by parasitic resistances of the switching elements SW1 to SW4, diodes D1 and D2, the inductor L1 and the storage capacitor C3. Without the inductor L1, not all of the energy stored in the capacitive load C2 will be transferred to the storage capacitor C3 so that power loss will increase.

When the fourth switching element SW4 is then closed for a predetermined time period before the subsequent rising edge of the tip voltage Vtip, the tip electrode 100 is pulled down and held at the reference potential 150 (e.g. ground potential) to thereby prevent crosstalk and/or other noise or interference.

The valve effect of the first diode D1 in the current path prevents a change of the flow direction of the current IL1 to thereby suppress an oscillation between the inductor L1, the storage capacitor C3 and the capacitive load C2.

Shortly before the subsequent rising edge, e.g., the transition of the tip voltage Vtip from low to high voltage, a closing (positive pulse of the respective control signal) of the third switching element SW3 under control of the driver control circuit causes a transition of the charge of the storage capacitor C3 via the second diode D2 and the third switching element SW3 into the capacitive load C2. This is indicated by a negative pulse in the waveform of the inductor current IL1. After that, the first switching element SW1 is closed at the rising edge of the tip voltage Vtip so that the capacitive load C2 is charged via the first switching element SW1 to the value of the supply voltage Vhv, while the second, third and fourth switching elements SW2 to SW4 are open.

Figure 12:
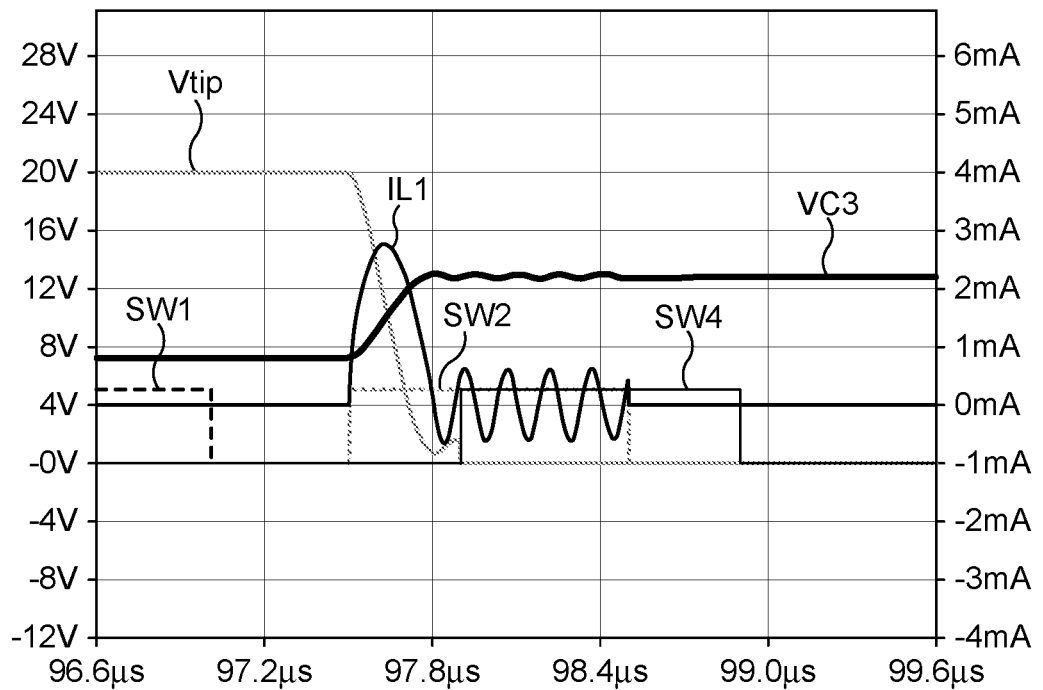
FIG. 12 is a waveform diagram with example measured signals of the second example of the enhanced push-pull circuit at a falling edge of a tip voltage of a stylus.

FIG. 12 is a waveform diagram with different measured waveforms of the tip voltage Vtip, a voltage VC3 across the storage capacitor C3, control signals of the switching elements SW1, SW2 and SW4, and the inductor current IL1 through the inductor L1 and the storage capacitor C3 obtained as a result of a simulation of the second example of the enhanced push-pull circuit at a falling edge of the tip voltage Vtip of the stylus. In this example, the tip voltage Vtip changes in a substantially rectangular manner between about +20V and 0V.

As shown in FIG. 12, the inductor current IL1 is generated as a positive pulse at the falling edge of the tip voltage Vtip and includes some small parasitic oscillations until the second switching element SW2 is opened again. These small parasitic oscillations are also reflected at the tip voltage Vtip and the voltage VC3 across the storage capacitor C3 which is stored to a value of about +13V during its fully charged state.

Figure 13:
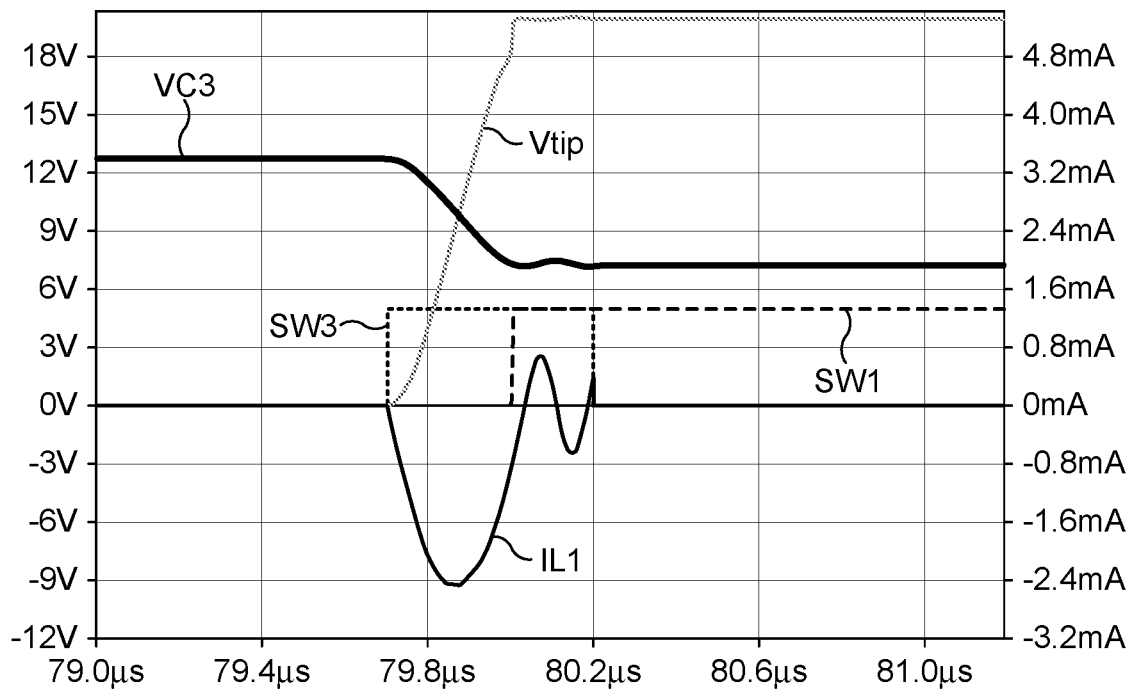
FIG. 13 is a waveform diagram with example measured signals of the second example of the enhanced push-pull circuit at a rising edge of the tip voltage of the stylus.

FIG. 13 is a waveform diagram with the different measured waveforms of the tip voltage Vtip, the voltage VC3 across the storage capacitor C3, the control signals of the switching elements SW1 and SW3, and the inductor current IL1 through the inductor L1 and the storage capacitor C3 of the simulation of the second example of the enhanced push-pull circuit at a rising edge of the tip voltage Vtip of the stylus.

As shown in FIG. 13, the inductor current IL1 is generated as a negative pulse at the rising edge of the tip voltage Vtip and includes some small oscillations until the third switching element SW3 is opened again. These small oscillations are also reflected at the tip voltage Vtip and the voltage VC3 across the storage capacitor C3 which is de-charged to a value of about +7V during its de-charged state. However, the re-charging of the capacitive load C2 with the stored charge of the inductor L1 by the inductor current IL1 during the closed state of the third switching element SW3 is not sufficient to reach the maximum value (+20V) of the tip voltage Vtip again due to remaining energy losses during the charging and re-charging process via the inductor L1. As can be gathered from the waveform diagram, the capacitive load C2 is nearly completely re-charged to the maximum supply voltage value of about +20V based on the charge of the storage capacitor C3. This illustrates the relatively little amount of energy loss in this example embodiment that includes the storage capacitance C3.

Figure 14:
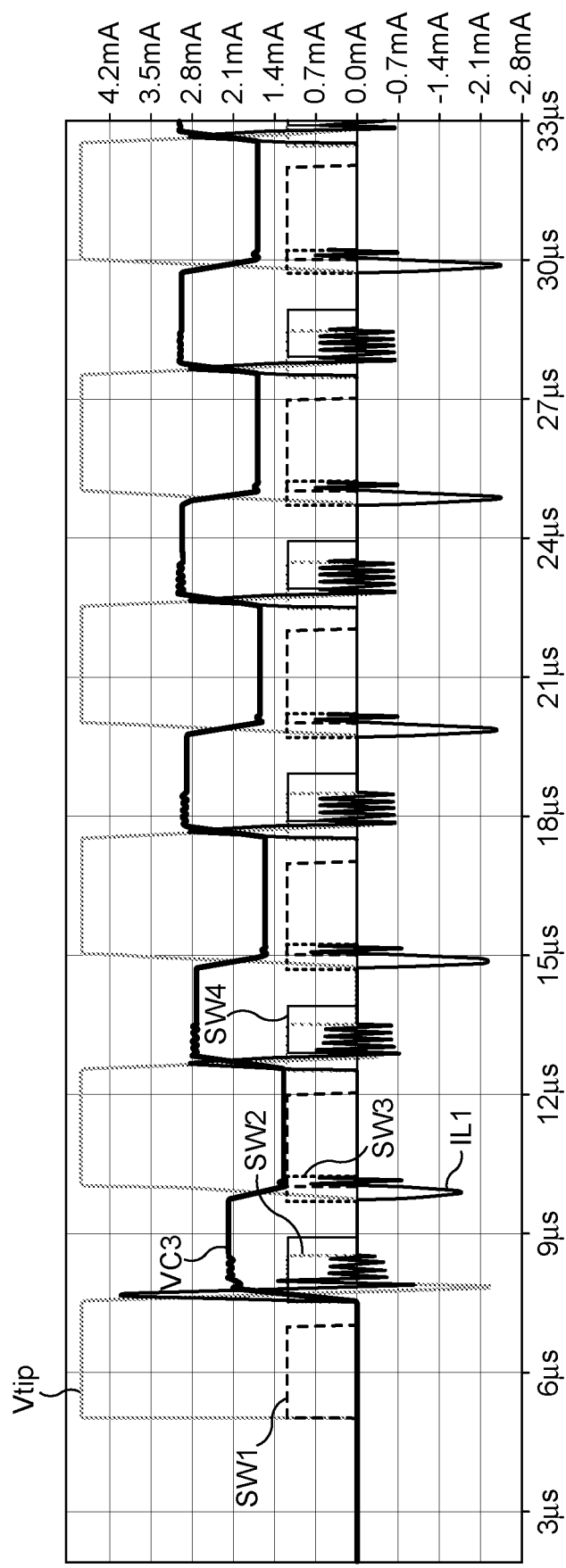
FIG. 14 is a waveform diagram with example measured signals of the second example of the enhanced push-pull circuit over a longer time period until a steady state is reached.

FIG. 14 is a waveform diagram with the different measured waveforms of the tip voltage Vtip, the voltage VC3 across the storage capacitor C3, the control signals of the switching elements SW1 to SW4, and the inductor current IL1 through the inductor L1 and the storage capacitor C3 of the second example of the enhanced push-pull circuit over a longer time period until a steady state is reached.

As illustrated in FIG. 14, in some implementations it takes multiple (e.g., three) charging/de-charging cycles of the storage capacitor C3 until a steady state with a constant maximum value of the voltage VC3 across the storage capacitor C3 has been reached. In the example of FIG. 10, the storage capacitance C3 is assumed to be bigger than the capacitive load C2. Thus, during a small initial time period until the steady state has been reached, it will take some time until sufficient energy has been transferred from the smaller capacitive load C2 to charge the larger storage capacitor C3 to its steady-state voltage (e.g. $10y$). Thereafter, during the steady state, the voltage at the storage capacitor C3 stays around its steady-state value (under the assumption that in average the high time and the low time of the binary waveform of the tip voltage Vtip is the same, which is true for any digital communication).

An apparatus and method for a voltage driver circuit have been described, where a path between a ground node and an output node includes an inductor and/or another storage element and an energy transfer circuit composed of at least two switching elements (e.g., transistors) and at least two valve elements (e.g. diodes). The energy transfer circuit operates to discharge a capacitive load (e.g. output capacitor) into the storage element and facilitate transition from low to high voltage while increasing efficiency. An additional path to ground may be included via another switching element to prevent crosstalk while holding the output at a ground potential.

With the proposed new designs of the driver circuit with the energy transfer circuit according to the above sample embodiments, the total power consumption of the driver circuit can be reduced substantially (e.g. from about 2.5 mW to about 0.2 mW) to thereby increase battery lifetime and efficiency. Furthermore, compared to alternative solutions, such as Collpits oscillators or adiabatic circuits, the proposed driver circuits can be used in connection with a wider range of frequencies and higher voltages, allow full control of high and low time of the driver output voltage and therefore enable digital data at base band level and advanced modulation in frequency and phase. Higher voltages allow smaller electrodes (e.g. at the tip of the stylus or the touch sensor of the digitizer) with less capacitive load and thus more precise determination of the stylus location.

It will be appreciated that the above embodiments have been described by way of example only.

More generally, according to one aspect (A1) disclosed herein, there is provided a driver circuit (e.g., driver circuit 120, FIG. 4) for supplying a drive signal via an output terminal (e.g., output terminal 100, FIG. 4) to a capacitive load (e.g., C2, FIG. 4), wherein the driver circuit comprises:
an energy storage element (e.g., SE 130, FIG. 4); and
an energy transfer circuit (e.g., PP 124, FIG. 4) configured to transfer energy from the capacitive load to the energy storage element at a first edge of the drive signal and to transfer energy from the energy storage element to the capacitive load at a second edge of the drive signal.

(A2) In embodiments of A1, the energy transfer circuit is controlled to intermittently connect the output terminal to a reference potential (e.g., ground potential 150 in FIGS. 4, 6 and 10) of the output voltage for a predetermined time period.

(A3) In embodiments of A1 or A2, the storage element comprises at least one inductive element (e.g., inductor L1, FIG. 6), at least one capacitive element (e.g., capacitor C3, FIG. 10), or a combination of at least one inductive element and at least one capacitive element.

(A4) In embodiments of A1-A3, the energy transfer circuit comprises an arrangement of at least two switching elements (e.g., SW2 and SW3, FIG. 6) and at least two valve elements (e.g., D1 and D2, FIG. 6).

(A5) In embodiments of A1-A4, the energy transfer circuit comprises a parallel connection of second and third switching elements with respective serially connected anti-parallel valve elements (e.g., D1 and D2, FIG. 6), the parallel connection being serially connected between a first switching element and the energy storage element in a circuit path between a terminal of a supply voltage and a reference potential of the drive signal at the output terminal, wherein the output terminal is connected between the first switching element and the parallel connection.

(A6) In embodiments of A5, the second switching element is controlled to be closed for a predetermined time period in conjunction with the first edge (e.g., a falling edge) of the drive signal to discharge the capacitive load via a first valve element (e.g., D1 FIG. 6) into the storage element.

(A7) In embodiments of A5 or A6, the third switching element is controlled to be closed in conjunction with the second edge (e.g., a rising edge) of the drive signal to cause the capacitive load to discharge into the storage element, and wherein thereafter the first switching element is closed and the third switching element is opened in conjunction with the second edge of the drive signal so that the capacitive load is charged via the first switching element, while the second and third switching elements are open.

(A8) In embodiments of A4-A7, a fourth switching element (e.g., SW4, FIG. 10) is connected between the output terminal and the reference potential.

(A9) In embodiments of A1-A8, the storage element comprises a series connection of an inductor and a capacitor (e.g., capacitor C3, FIG. 10), and wherein the capacitor is used as energy storage.

(A10) In embodiments of A1-A9, the energy transfer circuit is integrated on a chip or one or more chip modules, and wherein the storage element is arranged as a non-integrated external circuit element.

(A11) In embodiments of A4-A10, the third switching element is controlled to be closed in conjunction with the second edge (e.g., a rising edge) of the drive signal to cause a charge of the capacitive load to a first level via a transition of energy from the energy storage element (e.g., C3 in FIG. 10) via a second valve element (e.g., D2 in FIG. 10) and the third switching element into the capacitive load, and wherein thereafter the first switching element is controlled to be closed in conjunction with the second edge (e.g., a rising edge) of the drive signal so that the capacitive load is charged from the first level to a second level via the first switching element.

According to another aspect disclosed herein, there is provided a stylus (e.g., stylus 10, FIG. 1) comprising a driver circuit according to any embodiment disclosed herein (e.g., A1-A11), wherein the driver circuit is configured to supply the drive signal to a tip electrode of the stylus.

According to another aspect disclosed herein, there is provided a host device (e.g., host device 20, FIG. 1) comprising a driver circuit according to any embodiment disclosed herein (e.g., A1-A11), wherein the driver circuit is configured to supply the drive signal to a sensor array of a touch-sensitive display.

According to another aspect disclosed herein, there is provided a method of supplying a drive signal via an output terminal to a capacitive load, wherein the method comprises controlling an energy transfer circuit to transfer energy from the capacitive load to an energy storage element at a first edge of the drive signal and to transfer energy from the energy storage element to the capacitive load at a second edge of the drive signal. In embodiments, the method comprises controlling the push-pull circuit according to any embodiments disclosed here (e.g., A1-A11).

According to another aspect disclosed herein, there is provided a computer program embodied on computer-readable storage (e.g., within memory such as random access memory (RAM) or read only memory (ROM)) and comprising code configured so as when run on one or more processors to perform the method of any embodiment disclosed herein.

Examples and embodiments described herein may be implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system used for implementation. Accordingly, logical operations making up examples or embodiments described herein may be referred to variously as operations, steps, objects, or modules. Furthermore, it should be understood that logical operations may be performed in any order, adding and omitting as desired, unless explicitly claimed otherwise or a specific order is inherently necessitated by the claim language.

Other variants and applications of the disclosed techniques may become apparent to a person skilled in the art once given the present disclosure. The scope of the present disclosure is not limited by the above-described embodiments but only by the accompanying claims.

The invention claimed is:

1. An active stylus comprising:
a tip electrode adapted to form a capacitive coupling with a display screen; and
a driver circuit for supplying a rectangular drive signal to the capacitive coupling between the tip electrode and the display screen, wherein the driver circuit comprises an energy storage element and an energy transfer circuit configured to transfer energy from the capacitive coupling to the energy storage element at a first edge of the rectangular drive signal and to transfer energy from the energy storage element to the capacitive coupling at a second edge of the rectangular drive signal, wherein the energy storage element comprises an inductive element and a capacitive element coupled in series with the inductive element.

2. The driver circuit of claim 1, wherein the energy transfer circuit is controlled to intermittently connect an output terminal of the driver circuit to a reference potential of an output voltage for a predetermined time period.

3. The driver circuit of claim 1, wherein the energy transfer circuit comprises an arrangement of at least two switching elements and at least two valve elements.

4. The driver circuit of claim 3, wherein the energy transfer circuit comprises a parallel connection of a second switching element and a third switching element with respective serially connected antiparallel valve elements, the parallel connection being serially connected between a first switching element and the energy storage element in a circuit path between a terminal of a supply voltage and a reference potential of the rectangular drive signal at an output terminal of the driver circuit, wherein the output terminal is connected between the first switching element and the parallel connection.

5. The driver circuit of claim 4, wherein the second switching element is controlled to be closed for a predetermined time period in conjunction with the first edge of the rectangular drive signal to discharge a capacitive load, associated with the capacitive coupling, via a first valve element into the energy storage element.

6. The driver circuit of claim 4, wherein the third switching element is controlled to be closed in conjunction with the second edge of the rectangular drive signal to cause a capacitive load, associated with the capacitive coupling, to discharge into the energy storage element, and wherein thereafter the first switching element is closed and the third switching element is opened in conjunction with the second edge of the rectangular drive signal so that the capacitive load is charged via the first switching element, while the second switching element and the third switching element are open.

7. The driver circuit of claim 4, wherein a fourth switching element is connected between the output terminal and the reference potential.

8. The driver circuit of claim 4, wherein the energy storage element comprises a series connection of an inductor and a capacitor, and wherein the capacitor is used as energy storage.

9. The driver circuit of claim 8, wherein the energy transfer circuit is integrated on a chip or one or more chip modules, and wherein the energy storage element is arranged as a non-integrated external circuit element.

10. The driver circuit of claim 9, wherein the third switching element is controlled to be closed in conjunction with the second edge of the rectangular drive signal to cause a charge of a capacitive load, associated with the capacitive coupling, to a first level via a transition of energy from the energy storage element via a second valve element and the third switching element into the capacitive load, and wherein thereafter the first switching element is controlled to be closed in conjunction with the second edge of the rectangular drive signal so that the capacitive load is charged from the first level to a second level via the first switching element.

11. A method for operating an active stylus that includes a tip electrode adapted to form a capacitive coupling with a display screen, the method comprising:
supplying, via a driver circuit of the active stylus, a rectangular drive signal to the capacitive coupling between the tip electrode and the display screen; and
controlling an energy transfer circuit of the driver circuit to transfer energy from the capacitive coupling to an energy storage element of the driver circuit at a first edge of the rectangular drive signal and to transfer energy from the energy storage element to the capacitive coupling at a second edge of the rectangular drive signal, and wherein the energy storage element comprises an inductive element and a capacitive element coupled in series with the inductive element.

12. The method of claim 11, wherein the energy transfer circuit is controlled to intermittently connect an output terminal of the driver circuit to a reference potential of an output voltage for a predetermined time period.

13. The method of claim 11, wherein the energy transfer circuit comprises an arrangement of at least two switching elements and at least two valve elements.

14. The method of claim 11, wherein the energy transfer circuit comprises a parallel connection of a second switching element and a third switching element with respective serially connected antiparallel valve elements, the parallel connection being serially connected between a first switching element and the energy storage element in a circuit path between a terminal of a supply voltage and a reference potential of the rectangular drive signal at an output terminal of the driver circuit, wherein the output terminal is connected between the first switching element and the parallel connection.

15. The method of claim 14, wherein the second switching element is controlled to be closed for a predetermined time period in conjunction with the first edge of the rectangular drive signal to discharge a capacitive load, associated with the capacitive coupling, via a first valve element into the energy storage element.

16. A computer program embodied on computer-readable storage and comprising code configured so as when run on one or more processors to perform a method for operating an active stylus that includes a tip electrode adapted to form a capacitive coupling with a display screen, the method comprising:

supplying, via a driver circuit of the active stylus, a rectangular drive signal to the capacitive coupling between the tip electrode and the display screen; and controlling an energy transfer circuit of the driver circuit to transfer energy from the capacitive coupling to an energy storage element of the driver circuit at a first edge of the rectangular drive signal and to transfer energy from the energy storage element to the capacitive coupling at a second edge of the rectangular drive signal, and wherein the energy storage element comprises an inductive element and a capacitive element coupled in series with the inductive element.

17. The computer program of claim 16, wherein the energy transfer circuit is controlled to intermittently connect an output terminal of the driver circuit to a reference potential of an output voltage for a predetermined time period.

18. The computer program of claim 16, wherein the energy transfer circuit comprises an arrangement of at least two switching elements and at least two valve elements.

19. The computer program of claim 16, wherein the energy transfer circuit comprises a parallel connection of a second switching element and a third switching element with respective serially connected antiparallel valve elements, the parallel connection being serially connected between a first switching element and the energy storage element in a circuit path between a terminal of a supply voltage and a reference potential of the rectangular drive signal at an output terminal of the driver circuit, wherein the output terminal is connected between the first switching element and the parallel connection.

20. The computer program of claim 19, wherein the second switching element is controlled to be closed for a predetermined time period in conjunction with the first edge of the rectangular drive signal to discharge a capacitive load, associated with the capacitive coupling, via a first valve element into the energy storage element.

* * * * *